KLIPERD & NEWBURY.
Shovel and Tongs.
No. 97,523.                              Patented Dec. 7, 1869.
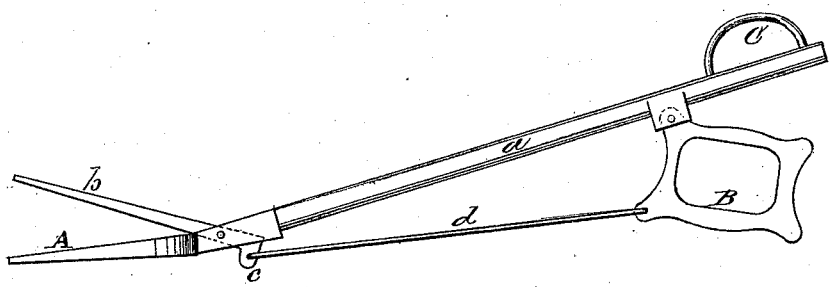
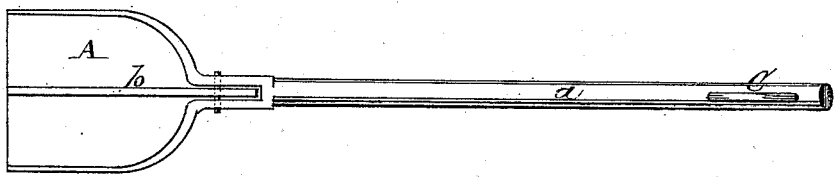

United States Patent Office.

HENRY KLIPERD AND BENJAMIN NEWBURY, OF CLARKSVILLE, OHIO.

Letters Patent No. 97,523, dated December 7, 1869; antedated November 30, 1869.

COMBINED SHOVEL AND TONGS.

The Schedule referred to in these Letters Patent and making part of the same.

*To all whom it may concern:*

Be it known that we, HENRY KLIPERD and BENJAMIN NEWBURY, of Clarksville, in the county of Clinton, and State of Ohio, have invented a new and useful Improvement in Combined Shovel and Tongs; and we do hereby declare that the following is a full, clear, and exact description thereof, which will enable those skilled in the art to make and use the same, reference being had to the accompanying drawings, forming part of this specification, in which—

Figure 1 is a side view of our improved combined shovel and tongs, when open.

Figure 2, a view of the upper side of the same, when closed.

Similar letters of reference indicate corresponding parts.

This invention relates to a new and useful mode of constructing a pair of tongs and a fire-shovel combined, and consists in hinging a tongue to serve as the prong of a pair of tongs, at the base of a shovel, and connecting the tongue by a rod, with a loop or bow pivoted to the upper end of the handle of the shovel, so arranged that the hand can clasp upon both parts in such a manner as to open and close the tongue and the shovel at pleasure, and thus make the instrument so constructed serve the double purpose of a fire-shovel and a pair of tongs.

A represents an ordinary fire-shovel, of which a is the handle.

A tongue, b, is pivoted to the lower part of the handle a, which serves for one prong of a pair of tongs, in conjunction with the shovel.

The tongue b either straddles or passes through the handle a, and on a bent projection, c, at its upper end, it is connected with a rod, d, that lies on the under side of the handle a, which rod, at its upper end, is connected with a bow or loop-piece, B, which is pivoted to the upper end of the handle a.

The handle a has a bow, C, on its upper side, at the end.

In order to use the combined shovel and tongs, the thumb of one hand is introduced into the bow C, on the handle a, and the fingers are passed through the bow or loop-piece B, when the tongue b and the shovel A may be opened and closed like the prongs of a pair of tongs, and employed for the purpose of both a shovel and tongs.

The tongue a is made with a groove on the under side, to grip better upon a piece of wood or coal, when the instrument is used as a pair of tongs. It grasps any object that may be seized very firmly, under the pressure of the hand bearing upon the handle a and the loop-piece B.

When used as a shovel, the tongue b is pressed down close, as shown in fig. 2.

Having thus described our invention,

What we claim as new, and desire to secure by Letters Patent, is—

The compound lever B d c b, when constructed, arranged, and combined with the shovel A a, in the manner and for the purpose herein set forth and described.

HENRY KLIPERD.
BENJAMIN NEWBURY.

Witnesses:
THOS. S. STRAWN,
AMBROSE N. WILLIAMS.